July 1, 1924.

A. H. WILLETT ET AL

FIRE BOX STRUCTURE

Filed March 25, 1920

WITNESS

INVENTORS
Alfred H. Willett
Harry S. Martin
BY
ATTORNEYS

July 1, 1924. 1,499,431
A. H. WILLETT ET AL
FIRE BOX STRUCTURE
Filed March 25, 1920 6 Sheets-Sheet 5

July 1, 1924.

A. H. WILLETT ET AL

1,499,431

FIRE BOX STRUCTURE

Filed March 25, 1920    6 Sheets-Sheet 6

WITNESS

Gustav Genzlinger.

INVENTORS
Alfred H. Willett
Harry S. Martin
BY
ATTORNEYS

Patented July 1, 1924.

1,499,431

UNITED STATES PATENT OFFICE.

ALFRED H. WILLETT, OF WEST NEW YORK, AND HARRY S. MARTIN, OF RIDGEWOOD, NEW JERSEY, ASSIGNORS TO AMERICAN ARCH COMPANY, OF NEW YORK, N. Y., A CORPORATION OF DELAWARE.

FIRE-BOX STRUCTURE.

Application filed March 25, 1920. Serial No. 368,491.

*To all whom it may concern:*

Be it known that we, ALFRED H. WILLETT and HARRY S. MARTIN, citizens of the United States, respectively residing at West New York, in the county of Hudson and State of New Jersey, and at Ridgewood, in the county of Bergen and State of New Jersey, have invented certain new and useful Improvements in Fire-Box Structures, of which the following is a specification.

This invention has reference to certain improvements in fire box structures particularly that type of fire box construction which is commonly used in locomotive fire boxes and in certain respects it is especially applicable to such arrangements of fire box chambers as are used in conjunction with fluid burners employing crude oil or other form of fluid combustible.

Certain features of the invention are also applicable to constructions in which powdered fuel may be used or a combination employing a fuel in part liquid or fluid and in part powdered or gaseous.

The first of the objects of our present invention is the provision of an apparatus of the character specified which can be economically and efficiently applied to the usual design of coal burning locomotive or furnace without the need which now exists in most types of oil burning apparatus of providing special designs and clearances between frames, driver wheels, trailer trucks or other parts commonly found under fire box grates in most locomotives. Our improvement involves the provision of a structure which can be readily attached to the usual type of coal burning fire box in place of the customary grate.

In most of the designs of apparatus of this character at present in use especially in wide fire box engines, the so-called flash pans or oil burning apparatus must be placed in a space ordinarily occupied by ash pans in coal burning engines and in some instances it is very difficult to make an arrangement which will fit into the available clearances without interference with some part of the mechanism.

A further object of our invention is the provision of fire box apparatus of the type referred to which can be constructed at a minimum cost on account of the use of certain standard forms and shapes of refractory bricks and supporting parts therefor, such for example as are frequently used in transverse refractory walls of the so-called combustion chamber furnace, and in the location of the various parts in such relation to the interior portions of the fire box proper as will not interfere either with the inspection of stay bolts or the full utilization of the fire box surface for the generation of steam.

A further object of this invention is the provision of an arrangement of the character specified in which the combustion zone or space will be placed within the fire box proper and above the level of the mud ring and will therefore, not interfere with any portion of the equipment that is below the level of the mud ring.

Still another object of our invention is the provision of a combustion chamber of the type referred to which will utilize both a back end burner and a refractory arch construction, and at the same time obtain a maximum length of flame travel or distance from the burner through the combustion space and around the arch to the flues whereby a maximum degree of efficiency is secured.

In order that our invention may be better understood, we will now proceed to describe the same in connection with the accompanying drawings in which in Figure 1 we have shown a longitudinal vertical section through a fire box of a locomotive having our improvement applied thereto, the construction being what is known as a long fire box or combustion chamber type.

Figure 18 is a longitudinal vertical sectional view through a fire box which is of the short type found in many locomotives in which there is no forward combustion chamber and in which, in order to increase the length of flame travel from the burner, under the arch and around to the flues, we have placed the burner in a thimble introduced in the rear water leg instead of in a chamber in advance of that point.

Figure 19 is a transverse sectional view through a portion of a longitudinal side wall in which a peculiar arrangement of a double funnel shaped opening for the passage of gas or products of combustion is provided to permit a partial flow of the heat laterally toward the inside of the side sheets.

Figure 20 is a side view of the arrangement shown in Figure 19 indicating the location of the gas or heat circulation passages referred to.

Referring now more particularly to Figures 1 to 5 inclusive, it will be seen that we have therein shown, as previously stated, a long or combustion space fire box of a locomotive having the usual arrangement of crown sheet 1, flue sheet 2, with flues 3 and arch supporting tubes 4, the rear ends of which find support in the rear inside sheet 5 that carries the door opening 6 passing through the rear water leg 7, the lower portion of which is closed by the mud ring 8. An arch 9 of refractory bricks of usual construction is employed, the forward edge of which rests against a transverse refractory wall 10 carried upon a transverse supporting channel 11 and forward of the channel 11 there is a floor plate 12, carrying a refractory floor 13, the plate 12 being supported at its forward edge by the forward part of the mud ring 8 which closes the lower side of the front water leg 14.

Figure 1:
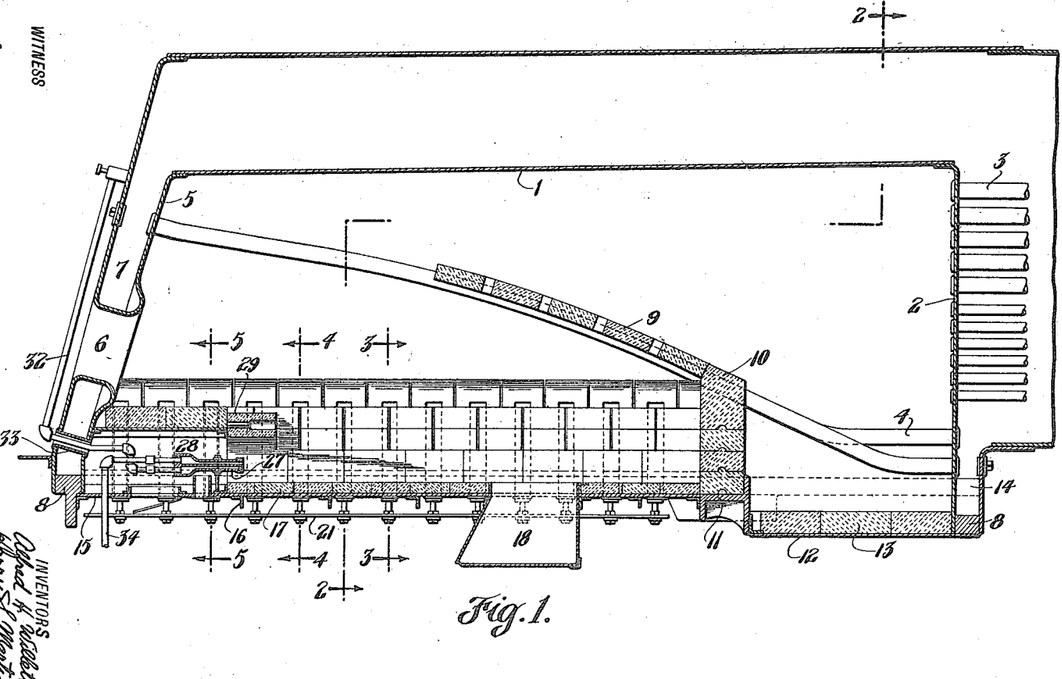
Figure 2:
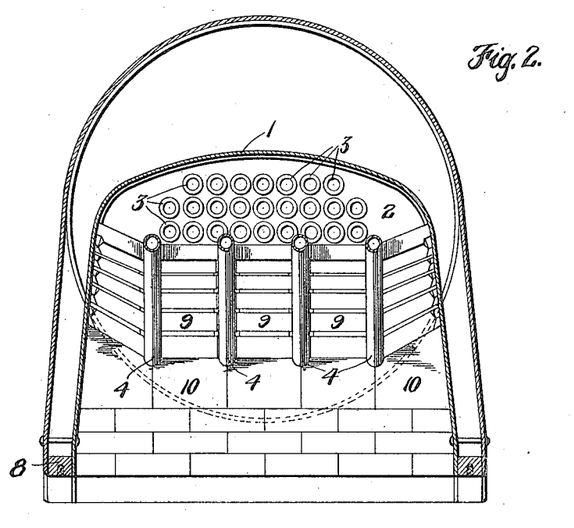
Figure 2 is a transverse section on the line 2—2 of Figure 1, but with our improvements omitted illustrating the construction as it would appear without them.

Supported by the rear portion of the mud ring 8 and the transverse channel 11, we provide a flat metal base or floor plate or supporting frame 15 strengthened by transverse angle irons 16 arranged at intervals as shown and upon the upper face of the bottom plate 15 we construct a floor of refractory bricks 17 through which at a point somewhat to the rear of the forward edge or end of the floor there is provided a clean-out hopper 18.

Extending upward through the bottom plate 15 and preferably welded thereto, we arrange some tubular supporting pipes 19 placed at intervals longitudinally in two rows a slight distance inside the side sheet of the fire box, the inlet opening at the bottom end of each of these pipes being controlled by a swinging damper 20 controllable by a common rod 21 attached to each of said dampers from some handle or other available actuating means in the cab.

The plate 15 is provided with supporting bolts as indicated at 22 adapted to be secured in the under side of the mud ring 70 and at a short distance from the mud ring as indicated at 23, we provide a corrugation or bend in the plate which will afford a certain amount of expansion and contraction and avoid straining of the parts or disconnection of the plate from the mud ring.

Figure 5:
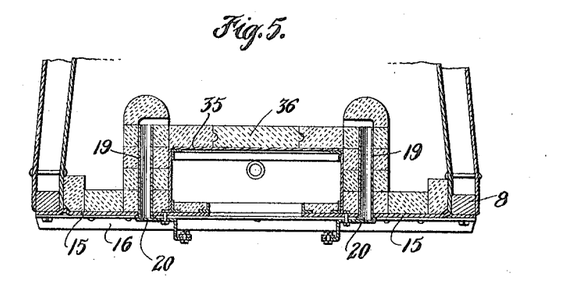
Figure 5 is a transverse section on the line 5—5 of Figure 1.
Figure 6:
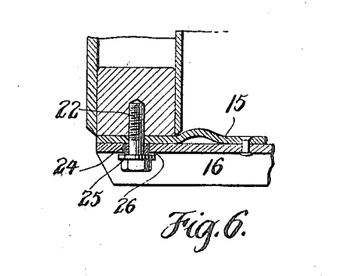
Figure 6 is a sectional detailed view showing an arrangement which we provide for securing a certain amount of expansion and contraction in the supporting plate and stiffening bars which carry the weight of the refractory bricks.

Some of the details last referred to are more clearly shown in Figures 5 and 6 by reference to which it will be seen that the angle member 16 at its ends has a motion longitudinally with respect to the plate 15 and a bolt 22 passes through an aperture 24 which is somewhat larger than a bushing 25 that surrounds the bolt and provides a stop means such as will leave a clearance at 26 under the bolt head whereby to permit of the freer movement of the parts.

Figure 4:
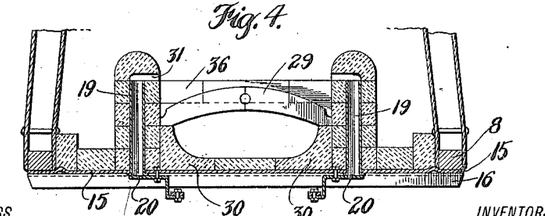
Figure 4 is a transverse section on the line 4—4 of Figure 1 showing the manner in which the structure of Figure 3 is applied to the fire box shown in Figure 2.

The burner 27 is preferably arranged in a chamber 28 as shown in Figure 1, and projects in a forward direction between the bricks 17 and a short arch structure 29 formed of two interlocking bricks more clearly shown in Figure 4 which rest upon the side trough bricks 30 in the arrangement shown, but may be otherwise supported if desired.

Figure 3:
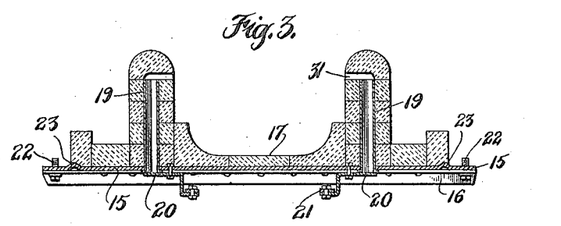
Figure 3 is a transverse section on the line 3—3 of Figure 1 showing those portions of the construction which embody our invention in one of the forms which it may take.

As indicated in Figure 3, the bottom of the combustion space between the burner and the wall 10 is like an inverted channel or trough and the air passages formed by the tubes 19 open and discharge laterally inward at intervals as indicated at 31 into the combustion space, along the upper edges of the trough or flameway. As shown, these openings 31 are formed as grooves in the lower sides of refractory coping brick over the upper ends of the respective pipes or tubes 19. The grooved coping brick rest on the tops of the longitudinal walls formed by refractory brick with vertically notched ends engaged between and supported by the upstanding tubes 19.

Where the burner is set above the level of the mud ring as indicated in Figure 1, we prefer to bring the steam supply pipe for the burner (marked 32), through a thimble 33 in the rear water leg 7 and downward as shown within the burner chamber 28 so as to eliminate any depression such as would form a pocket in which condensation might collect and freeze up when the burner was not in use or otherwise interfere with the burner operation. The oil supply pipe to the burner is brought up through the floor of the burner chamber as indicated at 34.

Figure 8:
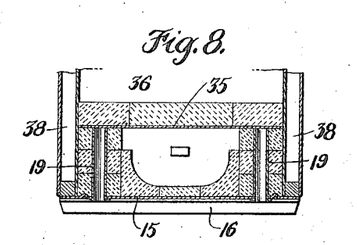
Figure 8 is a transverse sectional view illustrating the application of certain features of our improvement to a narrow fire box engine, the view being taken looking in the direction of the burner opening.

The top of the burner chamber, as indicated in Figure 8 is closed by a plate 35 on which are placed the refractory bricks 36. The bricks 29 and 36 together in effect form one refractory arch structure spanned between the longitudinal refractory walls at one end of the flameway, below the air discharge openings 31 (which are served by the tubes 19) in the corresponding portions of those walls.

Figure 7:
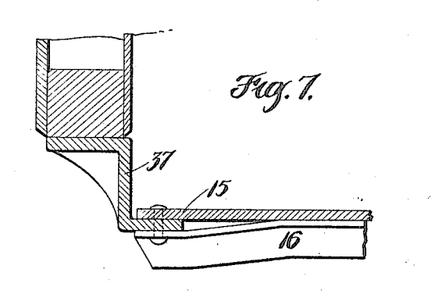
Figure 7 shows a small sectional view illustrating a modification of the supporting means used at one part of the bottom plate where the apparatus is used in association with what is called a toboggan mud ring.

As shown in Figure 7, where what is called a toboggan mud ring is used, that is one which slopes toward the front, the rear portion of the plate 15 may be supported by suitable brackets 37 so as to obtain a practically level position of the plate 15.

Figure 9:
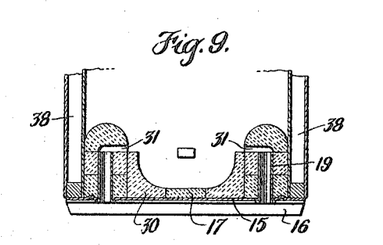
Figure 9 is a view similar to Figure 8, but showing air inlet passages opening toward the center from the vertical passages through the refractory side walls, this arrangement also being indicated as applied to a narrow fire box engine.

Figures 8 and 9 show the application of certain features of our improvement to a very narrow fire box in which there is not room for any combustion space between the longitudinal refractory walls and the side water legs 38 and in this arrangement because of the absence of the combustion space between the longitudinal walls and the side water legs, we prefer to use refractory walls which are lower than those shown in the other figures so as to get as much exposure of the water spaces at the sides as possible.

Figure 10:
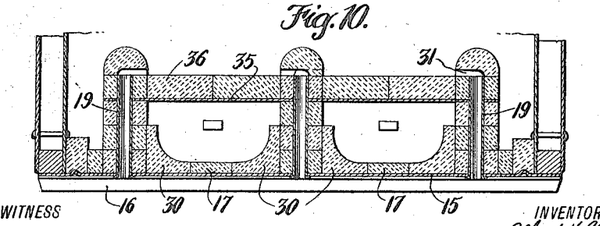
Figure 10 shows an application such as may be made if desired where the fire box is very wide, and it is desirable to have two parallel burners and combustion zones.

As it is desirable not to have the inverted channel or combustion trough in advance of the burner of too great a width, we use in some cases in a very wide fire box engine, the arrangement shown in Figure 10 in which a pair of such longitudinal troughs are shown involving the use of three longitudinal refractory walls with combustion space between the two outermost walls and the side water legs, the other parts corresponding substantially with the arrangement shown in the other figures.

Figures 11, 12, 13, 14, 15, 16, 17:
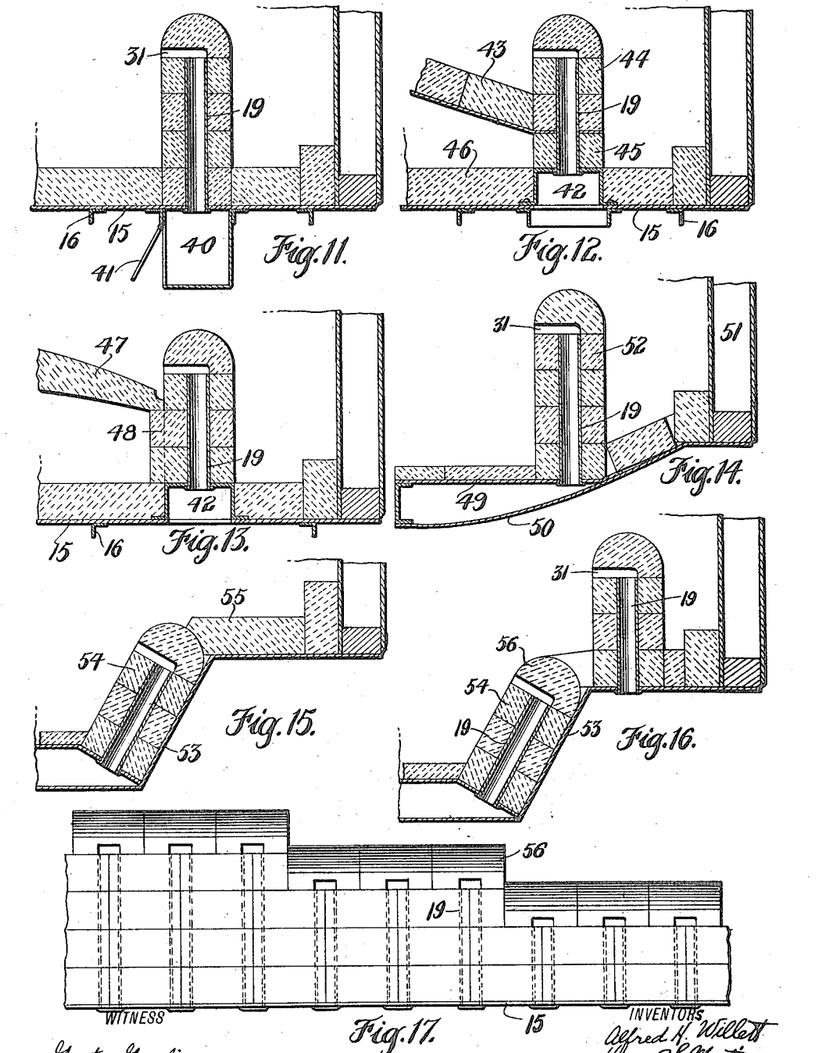
Figure 11 shows in sectional view an arrangement in which the longitudinally disposed vertical walls have their air passages connected at their inlet ends with a box or chamber extending longitudinally of the fire box on the underside of the plate which is below the mud ring.
Figure 12 shows a transverse sectional view similar to Figure 11, but in which the support of the refractory brick wall is upon a raised or upturned channel member and in which the primary arch rests between the upper and lower courses of the bricks.
Figure 13 shows a view similar to Figure 12, but having the primary arch supported by a slight extension of the refractory bricks of the longitudinal wall.
Figure 14 shows the application of the longitudinal wall with air passages of our invention as applied in a structure in which there is used what is termed a radial pan, the edges of which are carried on the underside of the mud ring.
Figure 15 shows a modification embodying certain features of our improvement as applied in a depressed pan in which the longitudinal refractory wall on either side is rested in inclined position upon the inside face of the steel supporting pan with a refractory floor construction between the upper end of the longitudinal wall and the mud ring at the side. This may be applied to existing types of pan by merely adding a secondary floor.
Figure 16 is a transverse sectional view similar to Figure 15, but in which there is employed in addition to the inclined refractory wall a vertical longitudinal wall located between the upper edge of the inclined wall and the mud ring and spaced away from the water leg at the side.
Figure 17 shows a stepped arrangement of the bricks of the longitudinal wall in which the higher portion of the wall at the left is to be placed adjacent to the burner so that as the flame is projected further forward in a combustion space, it will have greater clearance space under the inclined refractory arch than it would where the same height is used throughout the length of the longitudinal wall. Another feature of Figure 17 is the admittance of air on different levels to facilitate mixture of the air with combustible gas or vapor and if the higher portion of the longitudinal walls be placed near the flash wall, it will provide greater refractory surface for breaking up of the heavier portions of the combustible such as occur in heavy oils and will better protect the side sheets from impingement of the flame.

In case it is desired to substitute a common supply channel for the air which enters the vertical tubes 19 in place of the plurality of separate control dampers shown on Figure 1, we provide an arrangement similar to the one shown in Figure 11 in which a box 40 is used with a door or damper 41 that may be operated by any suitable apparatus convenient to the hand of the engineer, or fireman. The damper 41 is shown on the side of the trough but this can be located also at the ends or the bottom.

In Figure 12 we have shown a supporting inverted channel 42 for carrying the upright tubes 19 and in this arrangement the transverse arch bricks 43 are rested between the upper bricks 44 and the lower bricks 45 so as to bring the sides of the primary arch closer to the floor bricks 46.

As indicated in Figure 13, we have arranged to support the primary arch indicated at 47 upon refractory brick supports 48 which permits the use of the standard form of bricks around the tubes 19.

Figure 14 shows a saddle type of floor support, this comprising the plate 49 and the curved member 50 which latter is secured to the underside of the mud ring of the side water leg 51. This arrangement serves to lower the floor of the combustion space slightly and enables us to use a four course wall as indicated at 52, or one either higher or lower to suit requirements.

In some cases where there is plenty of available space underneath the level of the mud ring we may employ a depressed supporting plate 53 with the refractory brick wall in inclined position as shown at 54, there being provided a refractory floor between the top of the inclined wall and the side water leg as indicated at 55. This last described arrangement may be combined with the longitudinal wall of the other forms of our invention in a manner indicated in Figure 16 in which the wall 54 is within the longitudinal vertically disposed wall that is located between the upper edge of the wall 54 and the side water leg.

In some instances, as for example, where the refractory arch resting upon the tubes in the fire box stands quite low, we may use a form of construction like that shown in Figure 17 in which the height of the different portions of the longitudinal refractory walls is varied, that portion of the wall which comes nearest to the burner being composed, for example, of four bricks set upon each other, while the adjoining portion has but three courses, and the forward portion which comes nearest to the lowest part of the arch above has but two courses of refractory bricks all carried, however, upon the common floor plate 15 and supported by means of the tubes 19 that are welded in or otherwise secured to the plate 15. This condition may be reversed in cases where the arch is quite a distance from the base so that additional refractory surface is obtained and the side sheets protected from impingement of the flames.

Figures 18, 19, 20:
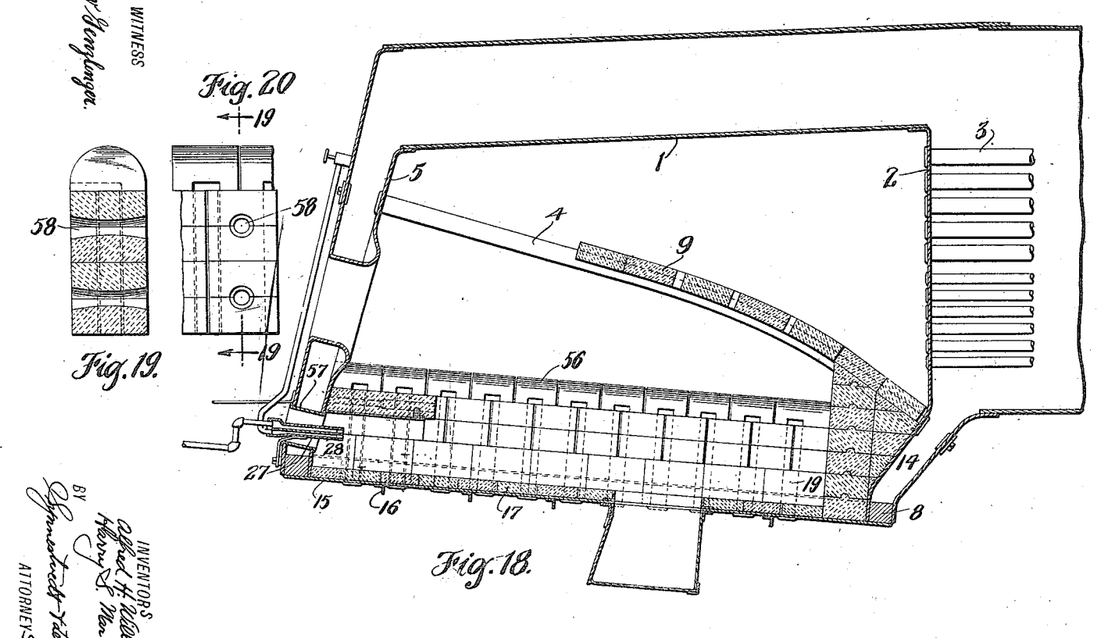

The cap bricks 56 are preferably made, as shown, in all of these several figures on this sheet with a recess on the under side which forms an extension of the air passage from the end of the tube 19 laterally to the combustion chamber space adjoining the refractory wall.

Where it is desired to apply our invention to an ordinary type of fire box engine, which has not sufficient length to include the forward combustion chamber type of furnace, we prefer to arrange the flash wall directly against the front water leg. In short fire boxes we prefer to locate the parts as shown in Figure 18 in which the burner 27 projects into the burner chamber 28 through a tube or thimble 57 secured in the rear water leg, and in which the arrangement of the other parts is similar to that already described. This feature provides means for obtaining the maximum flameway between the flash wall and burner. In this case as well as in that illustrated in Fig. 1, it will be seen, the refractory fire arch 9 extends from the refractory transverse wall about at the level of the lowermost boiler flues 3 rearward and upward over the longitudinal flameway, so as to afford long and deep unobstructed combustion spaces thereabove and therebelow. In both cases, also, there is an interval between the fire arch 9 and the tops of the longitudinal flameway or trough walls, to permit access of the hot gases to the sides of the fire box below the arch 9.

In some cases it may be desirable to form apertures extending transversely through the longitudinal refractory walls so as to provide for freer access of the heat to the combustion space at the outside of the said refractory walls, and these may be formed as indicated at 58 in Figures 19 and 20 with flared openings at either end so that they will not so readily be choked up in service.

Figure 21:
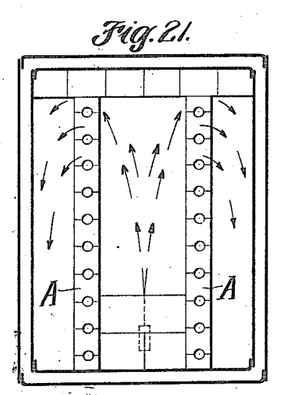
Figure 21 is a longitudinal plan section through a fire box showing the arrangement of the two longitudinally extending refractory walls and their relation to the burner and the combustion space between the walls as well as their relation to the side sheets and the combustion space outside the two refractory walls adjoining the side sheets.
Figure 22:
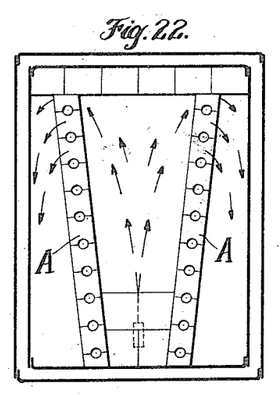
Figure 22 is a view similar to Figure 1, but showing the longitudinal walls arranged at a slightly divergent angle so as to increase the cross sectional area of the combustion space as the flame progresses forward after leaving the burner.

As indicated in Figure 21, we arrange the longitudinal refractory walls A at either side of the burner space with a combustion space between the outer side of the walls and the inner sheet of the side of the fire box. As shown in Figure 22, the walls A are arranged to diverge forwardly so as to allow for some expansion of the gases or fuel as it is being consumed in the combustion space.

Figure 23:
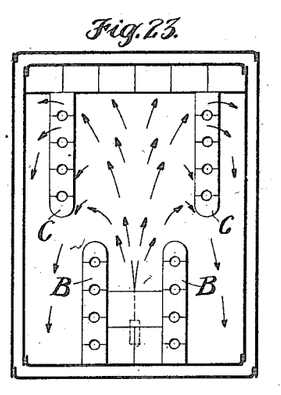
Figure 23 is a view similar to the view in Figure 22, but showing the two side walls broken near their middle point and arranged in somewhat staggered relation so as to secure a variation in the travel of the products of combustion which will suit some arrangements of arch and fire box better than the other arrangement shown.

In some cases we may arrange the longitudinal walls in sections or parts as shown in Figure 23 in which the portions nearest to the burner are marked B and those more removed as indicated at C are spaced somewhat apart from the portions B to allow passage of the products of combustion between the two.

Figure 24:
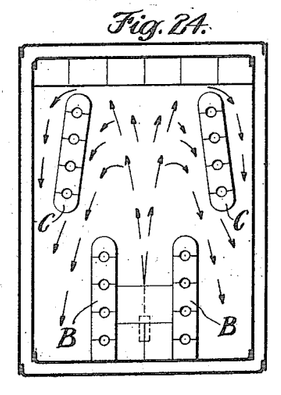
Figure 24 illustrates a slight modification of the wall arrangement shown in Figure 23 in which the flame travel will be slightly varied and the opening between the two portions of each wall will be slightly increased.

Figure 24 shows an arrangement in which the portions C are inclined somewhat from the horizontal vertical plane by which arrangement a larger opening is provided between the portions marked C and the portions marked B.

Figure 25:
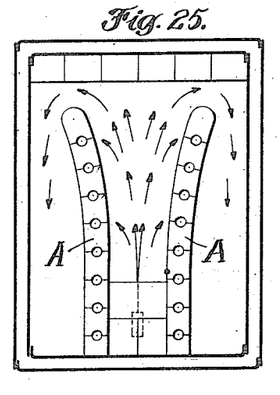
Figure 25 shows a view similar to Figure 22, but in which the divergence is in a gradually increasing ratio on a curve instead of in the straight line arrangement shown in Figure 22. The walls in this view are so arranged to provide a passage between the ends of the longitudinal walls and the flash wall to facilitate expansion and combustion of the gases.

Figure 25 shows an arrangement which in some respects corresponds to Figure 22 and provides a divergent space forwardly, but by a gradually increasing curvature of the side walls A.

Figure 26:
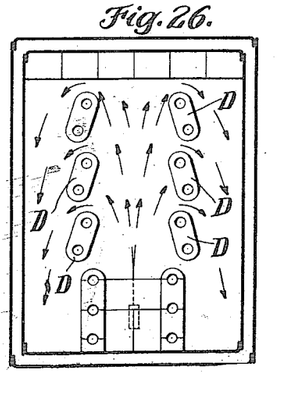
Figure 26 shows a view similar to the views shown in Figures 21 to 25 inclusive, but in which each side wall has been divided into a number of segments or parts, each part being inclined slightly from the horizontal with passages between adjacent parts for the flow of products of combustion laterally to heat the space adjacent to the inside side sheets of the fire box.

Figure 26 shows a series of deflecting, inclined parts marked D which we may use if desired where a greater number of apertures are wanted in the longitudinal side walls.

We claim:

1. A fire box structure having within the fire box chamber a pair of longitudinally disposed refractory walls constituting a flameway or trough, said walls being spaced away from the walls of the fire box chamber, and a plurality of air passages in said walls extending upwardly and then laterally inward into the fire box chamber adjacent the flame stream.

2. A fire box structure having within the fire box chamber a pair of longitudinally disposed refractory walls and supports for said longitudinal refractory walls located approximately at the base of the fire box chamber, the longitudinal walls being spaced away from the inner face of the side sheets of the fire box, and air passages extending through the refractory walls and opening into the space between the same, and means for controlling the inlet of air to said passages.

3. A fire box structure having within the fire box chamber a pair of longitudinally disposed refractory walls, base supports for said longitudinal refractory walls, the longitudinal walls being spaced away from the inner face of the side sheets of the fire box, and tubes forming vertical supports for the refractory walls at intervals, said tubes also serving as air passages.

4. A structure of the character described adapted to be applied to a locomotive fire box, and comprising a supporting floor for attachment to the mud ring; longitudinal refractory walls thereon forming a flameway or trough and spaced inward from the corresponding edges of the floor to afford combustion space between said walls and the fire box sides, with air passages in said walls discharging along the upper edges of the flameway trough; and a burner directed lengthwise of said flameway.

5. A structure of the character described adapted to be applied to a locomotive fire box, and comprising a supporting floor for attachment to the mud ring; longitudinal refractory walls thereon forming a flameway or trough and spaced inward from the corresponding edges of the floor to afford combustion space between said walls and the fire box sides, with air passages in said walls extending upward from beneath said floor and opening laterally inward into said trough at intervals in its length; and a burner directed lengthwise of said flameway.

6. A structure of the character described adapted to be applied to a locomotive fire box, and comprising a supporting floor for attachment to the mud ring; longitudinal refractory walls thereon forming a flameway or trough, with a refractory arch structure spanned between said walls over one end of the trough, and with air passages in said walls extending upward from beneath said floor and opening laterally inward, at intervals, over said arch structure and therebeyond in the length of the trough; and a burner in the chamber beneath said arch structure directed toward the other end of the trough.

7. A structure of the character described adapted to be applied to a locomotive fire box, and comprising a supporting floor for attachment to the mud ring; air supply tubes opening through said floor and upstanding therefrom; longitudinal refractory walls on said floor supported by said tubes and forming a longitudinal flameway or trough, with air discharge openings at intervals in their length served by said tubes; and a burner directed lengthwise of the space between said walls.

8. A structure of the character described adapted to be applied to a locomotive fire box, and comprising a supporting floor for attachment to the mud ring; longitudinal rows of air supply tubes opening through said floor and upstanding therefrom; and refractory brick with vertically notched ends engaged between and supported by said tubes and forming longitudinal flameway walls on said floor.

9. A structure of the character described adapted to be applied to a locomotive fire box, and comprising a supporting floor for attachment to the mud ring; longitudinal rows of air supply tubes opening through said floor and upstanding therefrom; refractory brick with vertically notched ends engaged between and supported by said tubes and forming longitudinal flameway walls on said floor; and refractory coping bricks over the upper ends of the respective tubes, with grooves in their lower sides for discharging the air laterally into the flameways between the walls.

10. In a locomotive fire box, the combination of longitudinal refractory walls forming a flameway or trough along the bottom of the fire box and spaced inward from the fire box sides to afford combustion space between, a transverse refractory wall across the forward end of said flameway, a refractory fire arch extending rearward from said transverse wall over said flameway, with an interval between the same and the tops of said longitudinal walls, and a longitudinally directed burner at one end of said flameway.

11. In a locomotive fire box, the combination of longitudinal refractory walls forming a flameway or trough along the bottom of the fire box and spaced inward from the fire box sides to afford lateral combustion space between, with apertures through said walls from said flameway to the lateral combustion spaces, a transverse refractory wall across the forward end of said flameway, a refractory fire arch extending rearward from said transverse wall over said flameway, with an interval between the same and the tops of said longitudinal walls, and a longitudinally directed burner at one end of said flameway.

12. In a locomotive fire box, the combination of a floor at the level of the mud ring, longitudinal refractory walls forming a flameway or trough along said floor, a transverse refractory wall across the forward end of said flameway, a refractory fire arch extending rearward from said transverse wall over said flameway, with an interval between the same and the tops of said longitudinal walls, a refractory arch structure spanned between said walls over the rear end of the flameway, and a forward directed burner in the chamber between said floor and said last mentioned arch structure.

13. In a locomotive fire box, the combination of a floor at the level of the mud ring, longitudinal refractory walls forming a flameway or trough along said floor, a transverse refractory wall across the forward end of said flameway, a refractory fire arch extending from said transverse wall substantially at the level of the lowermost boiler flues rearward and upward over said flameway, so as to afford long and deep combustion spaces thereabove and therebelow, and a longitudinally directed burner at one end of said flameway above said floor.

14. In a locomotive fire box, the combination of a floor at the level of the mud ring, longitudinal refractory walls forming a flameway or trough along said floor and spaced inward from the fire box sides to afford combustion space between, with air passages in said longitudinal walls extending upward from beneath said floor and discharging along the upper edges of the flameway trough, a transverse refractory wall across the forward end of said flameway, a refractory fire arch extending rearward from said transverse wall over said flameway, with an interval between the same and the tops of said longitudinal walls, and a longitudinally directed burner at one end of said flameway.

15. In a locomotive fire box, the combination of a floor, longitudinal refractory walls forming a flameway or trough along said floor, with air passages in said longitudinal walls discharging along the upper edges of the flameway trough, a transverse refractory wall across the forward end of said flameway, a refractory fire arch extending from said transverse wall substantially at the level of the lowermost boiler flues rearward and upward over said flameway, so as to afford long and deep combustion spaces thereabove and therebelow, with an interval between the same and the tops of said longitudinal walls, and a longitudinally directed burner at one end of said flameway.

16. A firebox structure having within the firebox chamber a pair of longitudinally disposed refractory walls, and a burner, said walls being spaced away from the walls of the firebox chamber and air inlets in said walls discharging adjacent the flame stream ahead of the burner.

17. A firebox structure with a rearwardly extending arch, a forwardly discharging oil burner at the rear of the firebox, and means for admitting air laterally into the firebox at a point intermediate the burner and the arch.

18. A firebox structure with a rearwardly extending arch, a forwardly discharging oil burner at the rear of the firebox, and means for admitting air laterally into the firebox above the flame stream at a point intermediate the burner and the arch.

19. A firebox structure with a rearwardly extending arch and having within the firebox chamber a pair of longitudinally disposed refractory walls, said walls being spaced away from the walls of the firebox chamber, a burner at the rear of the firebox discharging between said walls and means for admitting air laterally into the firebox at a point intermediate the burner and the arch.

20. A structure of the character described adapted to be applied to a locomotive fire box, and comprising a supporting floor for attachment to the mud ring; longitudinal refractory walls thereon forming a flameway or trough and spaced inward from the corresponding edges of the floor to afford combustion space between said walls and the fire box sides, with air passages in said walls discharging along the upper edges of the flameway trough.

In testimony whereof, we have hereunto signed our names.

ALFRED H. WILLETT.
H. S. MARTIN.